United States Patent Office 2,802,198
Patented Aug. 6, 1957

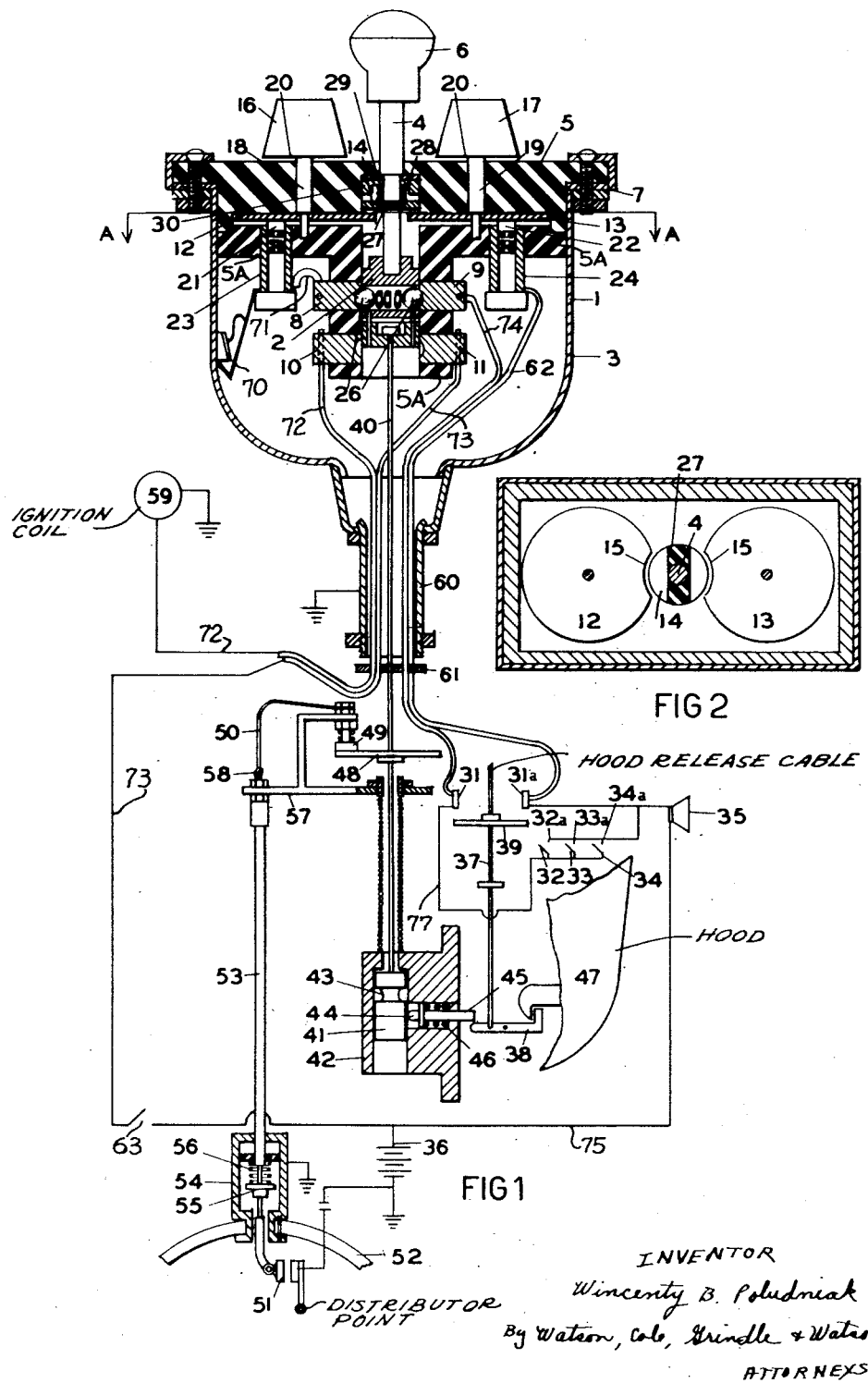

2,802,198

LOCKING SWITCH FOR MOTOR VEHICLES

Wincenty Bronislaw Poludniak, Rivonia, Johannesburg, Transvaal, Union of South Africa Application March 15, 1954, Serial No. 416,371

5 Claims. (Cl. 340—64)

This invention relates to means for preventing unauthorised use of a motor vehicle and is a continuation-in-part application of my application Serial No. 279,818, now abandoned. The invention relates particularly to a switch device which acts in its operative position to open the ignition circuit of a vehicle and connect an alarm into an ancillary circuit the alarm bein sounded by the closure of parts of the ancillary circuit due to movements of parts of the vehicle and/or interference with the switch which it is desired to protect.

Such devices are known but in general may be rendered inoperative when the current supply from the vehicle battery is cut off for instance by cutting the battery leads.

It is the object of this invention to provide a protective device of the type described above and incorporating a lockable switch having a movable bridging member the latter acting partly through an electrical circuit and partly through a mechanical linkage to prevent interference with the vehicle and/or switch circuit.

A preferred embodiment of this invention includes a lockable switch having a push-pull switching section operatively coupled to a pair of rotatable discs. The proper rotary matching position of the foregoing switch components is required to effectuate circuit operation in a motor vehicle whereby the ignition is energized and a protective alarm arrangement de-energized. In the event the lockable switch is not appropriately positioned, the ignition is inoperative and tampering with the vehicle, such as raising the hood or depressing of the lockable switch, will energize the alarm circuit.

The invention is illustrated schematically in the accompanying drawing in which:

Fig. 1 is a sectional side elevation of the combination lockable switch showing the parts electrically and mechanically connected to it; and Fig. 2 is a sectional elevation on the line A—A in Fig. 1.

As shown in Fig. 1 there is provided a combination lockable switch 1 which is of the two way push pull type and comprises a bridging member 2 housed in the switch body 3 and having a stem 4 projecting through the cover 5 of the body 3 and terminating in a knob 6. The body has a flange 7 by means of which it is secured to the cover 5 and also to the dashboard of a motor vehicle, the body 3 being grounded.

The bridging member 2 is movable to bridge either the switch contacts, 8, 9, or contacts 10, 11, its movement is however dependent on the positioning of a pair of rotatable discs 12, 13. The latter are positioned on opposite sides of the stem 4 and the circumferences of the discs 12, 13 project into the path of movement of a collar 14 secured to the stem 4. Each disc 12, 13 has an arcuately shaped piece cut from its rim so that when said cut away portions 15 are oppositely disposed on each side of the stem as shown in Fig. 2, they will allow the movement of the collar 14 past the discs 12, 13.

The discs 12, 13 form the locking members of the switch 1, and are set in position by a pair of knobs 16, 17 disposed above the cover plate 5 and connected to the discs 12, 13 by the shafts 18, 19. The knobs 16, 17 each have a registering mark or pointer and the cover plate 5 about the skirt 20 of each knob 16, 17 is numbered, or marked with other symbols so that the knobs 16, 17 may be positioned to align the cut away portions 15 of the discs 12, 13 to unlock the switch 1. If desired, the marking may be reversed with the symbols on the knobs 16, 17 and the indicating mark on the face of the cover 5. In this way the switch 1 is operable only through a combination lock.

The discs 12, 13 are also required to act as electrical conductors and be connected together. For this purpose the collar 14 and discs 12, 13 may be made of suitably conducting material and the leads are taken off the discs 12, 13 by means of brushes or spring loaded metal studs 21, 22 bearing on the under surfaces of the discs 12, 13 and fitted in sleeves 23, 24 of conducting material. The studs 21, 22, sleeves 23, 24 and contacts 8, 9 and 10, 11 for the switch 1 are all fitted in an insulating mounting 5A centrally bored to accommodate the collar 14 and bridging member 2. The latter is provided with spring loaded contacts 26 to ensure that a good contact is made between the terminals of switch 1. In order to prevent the discs 12, 13 being electrically connected by the collar 14 due to a light inadvertent pressure on the knob 6 or a light contact between collar 14 and discs 12, 13, the collar 14 may be made in two parts divided by an insulating partition member 27. Above collar 14 and normally separated therefrom by a light spring 28 is a further conducting collar 29 with downwardly projecting contact surfaces 30. With this arrangement it is necessary that a certain pressure be exerted on knob 6 to compress spring 28 before discs 12, 13 are connected through the conducting portions of collar 14 and collar 29.

In the position of the bridging member 2 shown in Fig. 1 the ignition circuit, through terminals 10, 11 is broken and the alarm circuit partly closed through terminals 8, 9. The terminal 8 is connected to earth through conductor 71, sleeve 23, and conductor 70 and the terminal 9 through conductor 74 and conductor 77 to one member of one or more pairs of contacts 31, 31a, 32, 32a, 33, 33a, 34, 34a, positioned at parts of the vehicle it is required to protect, the other member of each pair of said contacts being connected through the hooter 35 and conductor 75 to the battery 36. For example, as shown in the drawings the terminal 9 may be connected to a contact 31 forming one member of a pair of contacts 31, 31a. The contact 31a is connected to the vehicle battery 36 through the hooter 35 and conductor 75. The cable release 37 of the hood latch 38 is normally under spring tension and passes closely adjacent to the contacts 31, 31a and has a bridging member 39 secured to it so that as the cable release is pulled by an unauthorized person to break the lock, the bridging member 39 closes the electrical circuit from the grounded terminal 8 through terminal 9, conductor 74, contacts 31, 31a, audible alarm 35, conductor 75 and battery 36 to sound the alarm. In a similar manner by suitably attaching contacts 32, 32a, 33, 33a, 34, 34a, to other movable parts of the vehicle such as the ventilation window, the hood and/or a car radio these parts may be protected against tampering.

To the spindle 4 of the push pull bridging member of switch 1 is secured a Bowden cable 40. The other end of the cable is secured to block 41 movable in suitable guides 42 and having an indentation 43 to accommodate the rounded head 44 of a locking pin 45. In the position of the bridging member 2 shown in the drawings the block 41 has been pulled longitudinally so that the head 44 of the pin 45 cannot be accommodated in indentation 43, the pin 45 thus being forced outwardly against the pressure of its spring 46. The pin 45 is suitably placed so that in its projected position illustrated, it will engage the hood 47 or latch 38 therefor thus mechanically locking the hood 47 against movement.

The cable 40 is grounded by its connection to the block 41 or otherwise, and to it is secured, and electrically connected, a contact in the form of a disc 48 projecting concentrically around the cable 40. In the operative position of the switch 1, as illustrated, the disc 48 bears against a contact 49 which is connected through an electrical lead 50 to one of the points 51 of the vehicle distributor 52 thus grounding the latter and making it inoperative. To prevent the lead 50 being cut and thus making the distributor again operative, it is enclosed for the major portion of its length in a metal sheath 53 terminating in a tubular grounded metal housing 54 which is secured to the distributor casing in such a way that it forms an integral part of the distributor 52 and cannot be removed therefrom. To the lead 50 is secured, and electrically connected thereto, a distributor contact in the form of a collar 55 which is loaded by a spring 56 to move onto the inner end of the housing 54 and thus ground the distributor. The spring 56 is suitably insulated from the housing 54. The collar 55 is normally prevented from moving to ground the distributor 52 by the lead 50 which passes through a bracket 57 and has an extension or enlarged portion 58 preventing its movement in the sheath 53 under the influence of the spring 56. The lead 50 will thus normally be under tension. Should the sheath 53 and lead 50 be cut to make the distributor 52 effective the tension on the lead 50 is released thus allowing the collar 55 to bear against the housing 54 thus permanently grounding the distributor 52 so that it cannot again be made effective until all the parts are reset. Such an operation will normally require the services of a mechanic and possibly replacement of the distributor casing. Under certain circumstances, the distributor may be grounded directly from the switch 1 by connecting the lead 50 to the terminal 9. Ignition switch 63 when closed energizes ignition coil 59 by current flow from battery 36 in a circuit which includes switch 63, conductor 73, contact 10, contact 11, conductor 72 through ignition coil 59 to ground.

The different leads from the switch 1 to the coil 59, and the ignition and ancillary circuits are brought from the switch 1 through a metal tube 60 which extends from the body of the switch 1 to a position underneath the hood 47 of the vehicle. The tube 60 is earthed in any suitable manner. Beyond the end of the tube 60 remote from the switch 1 is a metallic conductor 61 having at least one dimension larger than the diameter of the tube 60 and electrically connected to the lead 62 which is connected to contact 31a. The purpose of conductor 62 is to prevent removal of the switch 1 from the dashboard to gain access to the interior thereof or to the leads. Should an attempt be made to do this, as the switch 1 is pulled out it will draw the leads through the tube 60 causing the conductor 61 to contact the tube 60 thereby energizing alarm 35 by current flow from battery 36 in a circuit which includes conductor 75, alarm 35, conductor 62 and conductor 61 to grounded body 3. In a similar manner should an attempt be made to cut through tube 60 from the inside of the car the cutting tool will ground lead 62 to tube 60 again closing the electrical circuit through the alarm 32.

The switch 1 is made inoperative so as to disconnect the alarm circuit and allow for normal driving by pushing the spindle 4 inwardly. An attempt to push the spindle 4 inwardly will close the alarm circuit through conductor 70, sleeve 23, contact 21, disc 12, collars 14 and 29, disc 13, contact 22, sleeve 24, conductor 62, alarm 35, conductor 75, and battery 36 to ground unless the combination locking elements are properly set to allow the collars 14 and 29 to move past the indented portions 15 of the discs 12, 13.

The pushing of the spindle 4 inwardly disconnects the alarm circuit through contacts 8, 9, even though contacts such as 31, 31a are connected by movement of the hood release cable 37 and allows the ignition circuit to be closed through contacts 10, 11. At the same time, the movement of the Bowden cable 40 connected to the spindle 4 moves the disc 48 to break the circuit through contact 49 so that the distributor 52 is no longer grounded. The cable also moves block 41 so that the indentation 43 therein is in registration with the head 44 of pin 45. This in turn allows the pin 45 to move inwardly under the influence of its spring 46 thus removing the obstruction to the movement of the hood 47 or latch 38 therefor.

With the switch 1 in the inoperative position, the collars 14 and 29 are positioned on the inside of the discs 12, 13. To prevent the alarm being sounded by inadvertent contacting of the discs 12, 13 by the collar 29 the outer side of the latter may be made as a separate disc of insulating material.

What I claim as new and desire to secure by Letters Patent is:

1. In a motor vehicle including an ignition system and a movable hood incorporating a hood release mechanism, the improvement comprising a combination switch including a movable push-pull stem, first conducting means supported at a first position on said stem, second conducting means supported at a second position on said stem, and a pair of rotatable discs projecting into the path of movement of said first conducting means when the stem is actuated, each of said discs having a circumferential cut-away portion sufficiently large to enable said first conducting means to selectively clear said discs when said stem is actuated, a cable coupled to said stem and actuated by the movements of said stem, a first alarm circuit including said discs and first conducting means, said alarm circuit being energized by the contact of said first conducting means with said discs in response to the actuation of said stem, a second alarm circuit including said second conducting means together with a first pair of contacts and an electrical switch operable by said hood release mechanism, said second alarm circuit being energized in response to the unactuated positioning of said stem and the closure of said electrical switch by the forcing of said hood release mechanism, an ignition circuit including said second conducting means together with a second pair of associated contacts, said ignition circuit being energized in response to the actuated positioning of said stem and the appropriate selective positioning of said lockable switch which enables said first conducting means to clear said discs, and means actuated by said cable for locking the hood release mechanism in response to the unactuated positioning of said stem whereby said electrical switch is held in an open position.

2. The combination of claim 1 including third conducting means carried by said cable and grounding the ignition system in response to the unactuated positioning of said stem.

3. The combination of claim 1 including a housing for said combination switch, and fourth conducting means connected to one of the electrical conductors connected to said switch, said fourth conducting means completing a ground connection through said housing for one of said alarm circuits in response to the withdrawal of said combination switch from said housing.

4. A combination switch comprising a hollow metallic switch casing formed with a tubular neck portion at one end and an opening at the other end, an insulating cover fitted into said opening, an axially movable switch operating stem centrally located with respect to said cover and passing therethrough, first conducting means supported at a first position on said stem and within said casing, second conducting means supported at a second position on said stem and within said casing, a pair of discs each rotatably supported on opposite sides of said first conducting means and projecting into the path of movement of said first conducting means when the stem is depressed, a pair of position selecting stems projecting through said cover and each coupled to a different disc, each of said discs having a circumferential cut-away portion sufficiently large to enable said first conducting means to selectively clear said discs when said switch operating stem is depressed and said discs are appropriately positioned by the stems coupled thereto, a pair of friction contacts establishing individual electrical connections to said discs, first and second sets of contacts positioned within said casing adjacent the path of movement of said second conducting means, said first set of contacts being in normal contact with said second conducting means and said second set of contacts being in contact with said second conducting means in response to the actuation of said operating stem, and a Bowden wire passing through said tubular neck portion and coupled to said operating stem to be movable therewith, and a plurality of conductors passing through said tubular neck for making external connections to said switch.

5. Ignition apparatus comprising a switch including an operating stem, a Bowden wire coupled to said stem and movable therewith, an electrical contact coupled to said Bowden wire and movable therewith, a distributor terminal, a conductor connected to said distributor terminal, a contact coupled to said conductor and movable therewith, a housing connected to ground enveloping said conductor contact, a spring enclosed within said housing and applying a spring force to said conductor contact placing said conductor under tension, a stationary contact connected to the terminal end of said conductor opposite the end connected to said distributor terminal, said stationary contact normally contacting said movable contact coupled to said Bowden wire, and means grounding said Bowden wire whereby said distributor terminal is grounded unless said Bowden wire is displaced to remove said movable contact from said stationary contact in response to the operation of said stem.

References Cited in the file of this patent

UNITED STATES PATENTS

| | | |
|---|---|---|
| 1,364,048 | Gilland | Dec. 28, 1920 |
| 1,419,227 | Coo | June 13, 1922 |
| 1,571,935 | Fleming | Feb. 9, 1926 |
| 2,224,894 | Brendler | Dec. 17, 1940 |
| 2,385,285 | Kolias | Sept. 18, 1945 |

FOREIGN PATENTS

| | | |
|---|---|---|
| 12,476 | Great Britain | 1894 |
| 254,831 | Germany | Dec. 16, 1912 |